United States Patent Office 3,317,610
Patented May 2, 1967

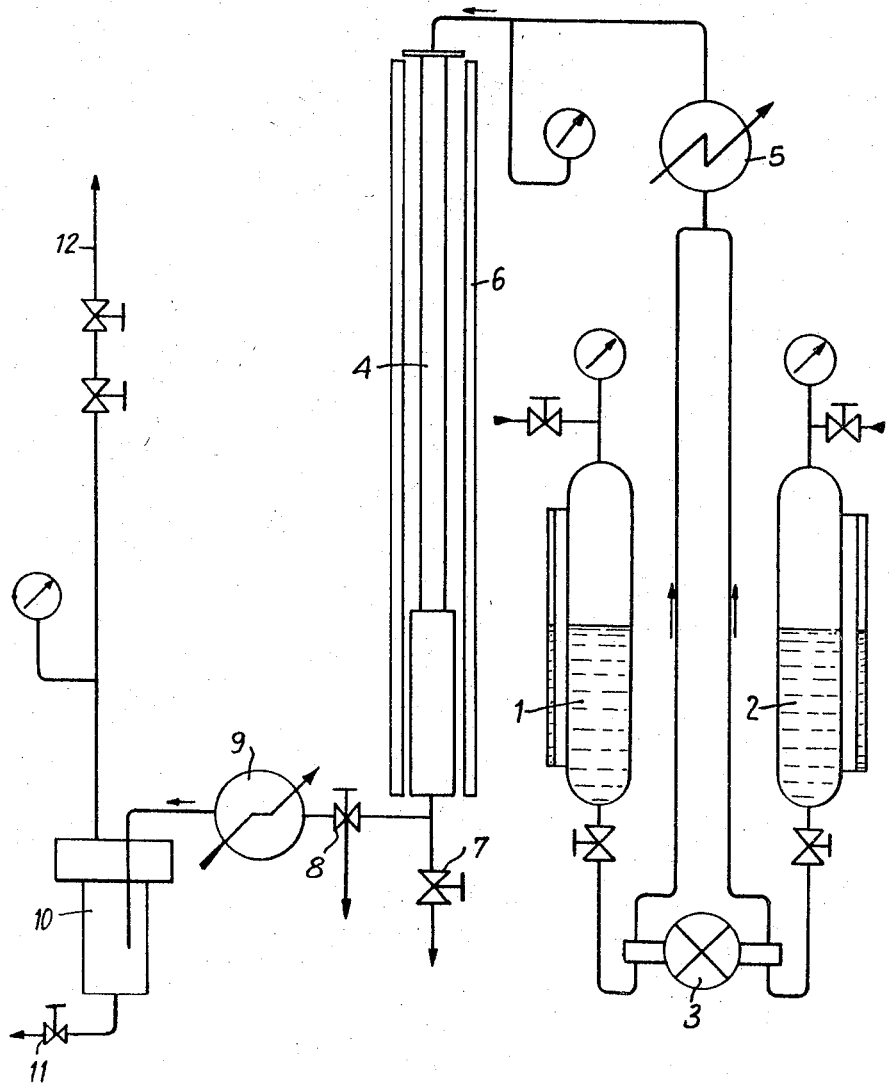

3,317,610
MANUFACTURE OF THIOETHERS IN THE GASEOUS PHASE
Paul Vannel, Lagor, France, assignor to Societe Nationale des Petroles d'Aquitaine, Paris, France
Filed Feb. 14, 1964, Ser. No. 344,872
Claims priority, application France, Feb. 18, 1963, 925,155
7 Claims. (Cl. 260—609)

The present invention relates to the manufacture of thioethers of the general formula R—S—R′, in which R and R′ represent alkyl groups having a straight or branched chain. It is particularly concerned with the manufacture of lower alkyl sulphides, particularly ethyl sulphides.

It is known to effect the synthesis of thioethers from olefins and hydrogen sulphide in the vapor phase; in accordance with a fairly large number of existing processes, this reaction is catalyzed by substances such as alumina, phosphates, cadmium sulphide, etc. However, the application of the known processes generally leads to rather low conversion rates; the thioethers which are formed have the feature that they inhibit the known catalysts.

The present invention overcomes these disadvantages: it enables thioethers to be manufactured with high conversion rates which can reach or exceed 80%, the product obtained having a good degree of purity. The new process according to the invention also has the advantage of permitting the use of impure hydrogen sulphide, taken for example in the form of the sulphuretted gases originating from natural gases which contain, as well as $H_2S$, a fairly high proportion of $CO_2$; it is preferable that the content of this additional gas does not exceed 50%.

The process according to the invention consists primarily in using an active carbon as catalyst. More particularly suitable are the carbons impregnated with one or more salts or oxides of noble metals and particularly metals of the group I-B of the Periodic System of the Elements. Very good results are obtained with active adsorbent carbon impregnated with a salt of silver, soluble in water, such as for example nitrate, sulfate, borate, chlorate, perchlorate, fluoride, silicofluoride or tartrate, while nitrate is preferred. The proportion of the noble metal salt may vary to a large extent but best results are obtained when the weight of metal per 100 g. of the catalyst is about 1 to 25 grams; practically amounts of 3 to 12 g. are very convenient. Of course, when the chosen salt of noble metal is slightly soluble in water, organic solvent may be used for the impregnation which is carried out by a procedure known to those skilled in the art.

This feature of the invention results from the unexpected discovery that the active carbons do not have a tendency to form stable compounds with the sulphuretted products at reaction temperatures which are between 150° and 350° C., whereas the salts and oxides of the aforementioned metals, particularly those of silver, have the property of promoting the formation of thioethers.

According to another feature of the invention, the treatment of one or several olefins with hydrogen sulphide takes place in the vapor phase under pressure. The pressure can vary from 1 to 300 atm. according to the nature of the reaction medium and according to the temperature, but it is preferably of the order of 10 to 300 atm.; it has the effect of increasing the reaction velocity and of displacing the various chemical equilibria of condensation of olefins and $H_2S$ towards the formation of thioethers instead of mercaptans. The pressure is utilized for obtaining a maximum conversion rate of the olefin, this independently of the molecular ratio between $H_2S$ and olefin.

Although the temperature may be between approximately 150° and 350° C., it is preferably between 200 and 300° C., at least as regards the condensation of ethylene with hydrogen sulphide in order to give ethyl sulphide.

The new process can serve for the preparation of a whole series of thioethers from various olefins, and more particularly olefins of which the number of carbon atoms is from 2 to 6.

The manufacture in accordance with the process of the invention can be carried out in any appropriate apparatus of known type. One particular installation which permits the process to be carried out continuously under very favorable conditions is hereinafter described; it likewise forms part of the invention.

In the accompanying drawing, which illustrates this installation, there are provided two storage containers 1 and 2 which respectively contain hydrogen sulphide and a liquid olefin. The container 1 may possibly contain a gas with a more or less high $H_2S$ content but also containing for example $CO_2$. The two containers are connected to the proportioning pump 3, which serves to inject the reagents into the reactor 4. During their travel, these reagents pass through a combined mixer and preheater 5.

The tube forming the reactor 4 is enclosed by a water jacket 6 which serves at the same time to heat the tube 4 and to discharge the excess of heat units in the form of steam, when this latter cannot be achieved adequately by the reaction medium itself.

At the outlet of the reactor, shown at the bottom end, there are arranged: a drain cock 7, a sampling device 8, a refrigerator 9 and a separator 10, at the bottom of which the product of the manufacturing process is withdrawn through 11. Arranged above the separator is a pipeline 12 leading towards bubbler devices, a meter and a torch. The discharging gases can be recycled when they do not contain $CO_2$.

The invention is illustrated by the following non-limiting examples.

Example 1

A mixture of 1000 volumes of ethylene and 500 volumes of $H_2S$ are delivered continuously at a space velocity of 450 into an apparatus such as that which has been described above. The gaseous mixture at 270° C. under a pressure of 50 atm. enters the reactor tube, which contains activated carbon impregnated with about 10% of silver acetate.

After a single passage of the gaseous mixture over the catalyst, there are obtained 1280 parts of product with a content of 92% of ethyl sulphide $C_2H_5$—S—$C_2H_5$; the complement of 8% is composed solely of ethanethiol. Yield of 94%, based on transformer $C_2H_4$.

Example 2

Replacing the catalyst of Example 1 with activated charcoal impregnated with about 10% of silver nitrate, i.e. 6.35% Ag 1000 volumes of ethylene with 500 volumes of $H_2S$, accompanied by 380 parts of $CO_2$, are continuously sent through the reaction tube. The space velocity is 300, and the operation takes place at 250° C. at a pressure of 50 atm. The conversion rate of ethylene into ethyl sulphide is then 80% and the product obtained contains 95% of $C_2H_5$—S—$C_2H_5$, the remainder being ethanethiol. Yield, based on $C_2H_4$, is 97%.

Example 3

In an operation conducted as in Example 2, there is used a catalyst formed solely of activated charcoal which is not impregnated with metallic salt. The yield of ethyl sulphide, in relation to the ethylene which has reacted, was 80%.

Example 4

1000 parts by volume of propylene, 500 parts by volume of $H_2S$ and 380 parts of $CO_2$ are delivered continuously at a space velocity of 450 at 260° and under a pressure of 50 atm. through a bed of charcoal impregnated with about 10% of silver nitrate. There are obtained 1300 parts of product which is practically free from mercaptan (1.3% of SH). After rectification, there are collected 1220 parts of a product distilling over between 120 and 130°, corresponding to the thioether $C_6H_{14}S$. Microanalysis has shown:

Found: C, 60.8%; H, 11.8%; S, 27.3%. Calculated: C, 61.0; H, 11.86%; S, 27.1%.

Example 5

In a test identical with the preceding example, the propylene is replaced by a butene cut. After rectification, there are obtained 20 parts of product containing 34.6% of SH and 1190 parts of a product having a boiling point in the range of 160° to 170°, corresponding to the thioether of formula $C_8H_{18}S$. Microanalysis shows the following result.

Found: C, 65.5%; H, 12.3%; S, 22.0%. Calculated: C, 65.7%; H, 12.33%; S, 21.9%.

What is claimed is:

1. Method for producing thioethers by reacting hydrogen sulfide with olefins in the presence of a catalyst, which consists in contacting a gaseous mixture of hydrogen sulfide and at least one olefin having 2 to 6 carbon atoms in its molecule, at a temperature of 150° to 350° C., with a catalyst consisting of active carbon.

2. Method for producing thioethers by reacting hydrogen sulfide with olefins in the presence of a catalyst, which consists in contacting a gaseous mixture of hydrogen sulfide and at least one olefin having 2 to 6 carbon atoms in its molecule, at a temperature of 150° to 350° C., with a catalyst consisting of active carbon which has been previously impregnated with an aqueous solution of a silver salt selected from the group consisting of silver nitrate, silver sulfate, silver borate, silver chlorate, silver perchlorate, silver fluoride, silver silicofluoride and silver tartrate.

3. Method for producing thioethers by reacting hydrogen sulfide with olefins in the presence of a catalyst, which consists in passing a gaseous mixture of hydrogen sulfide with at least one olefin having 2 to 6 carbon atoms in its molecule, at a temperature of 150° to 350° C., through a bed of a catalyst consisting of active carbon.

4. Method for producing thioethers by reacting hydrogen sulfide with olefins in the presence of a catalyst, which consists in passing a gaseous mixture of hydrogen sulfide with at least one olefin having 2 to 6 carbon atoms in its molecule, at a temperature of 150° to 350° C., through a bed of a catalyst consisting of active carbon which has been previously impregnated with an aqueous solution of silver nitrate until the carbon contains 1 to 25% by weight of silver.

5. Method for producing thioethers by reacting hydrogen sulfide with olefins in the presence of a catalyst, which consists in passing a gaseous mixture of hydrogen sulfide with at least one olefin having 2 to 6 carbon atoms in its molecule, at a temperature of 150° to 350° C., under a pressure of 10 to 300 atmospheres, through a bed of a catalyst consisting of active carbon which has been previously impregnated with an aqueous solution of silver nitrate until the carbon contains 1 to 25% by weight of silver.

6. Method for producing thioethers by reacting hydrogen sulfide with olefins in the presence of a catalyst, which consists in passing a gaseous mixture of 1 part by volume of hydrogen sulfide with about 2 parts by volume of at least one of the olefins ethylene, propylene and butylene, at a temperature of 200° to 300° C., under a pressure of about 50 atmospheres, with a space velocity of 300 to 500, through a bed of activated carbon, and in then separating the thioether formed from the effluent which leaves said bed.

7. Method for producing thioethers by reacting hydrogen sulfide with olefins in the presence of a catalyst, which consists in passing a gaseous mixture of 1 part by volume of hydrogen sulfide with about 2 parts by volume of at least one of the olefins ethylene, propylene and butylene, at a temperature of 200° to 300° C., under a pressure of about 50 atmospheres, with a space velocity of 300 to 500, through a bed of activated carbon which has previously been impregnated with about 10% of a salt selected from the group consisting of silver acetate and silver nitrate, and in then separating the thioether formed from the effluent which leaves said bed.

No references cited.

CHARLES B. PARKER, *Primary Examiner.*

D. PHILLIPS, *Assistant Examiner.*